United States Patent Office 2,898,547
Patented Aug. 4, 1959

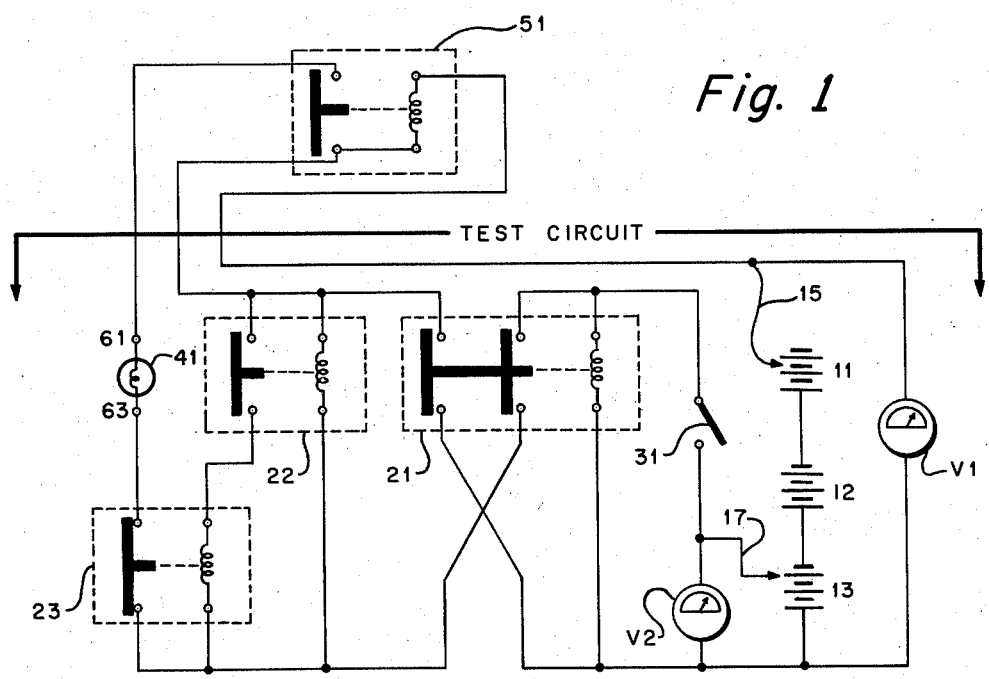
*Fig. 1*
*Fig. 1a*
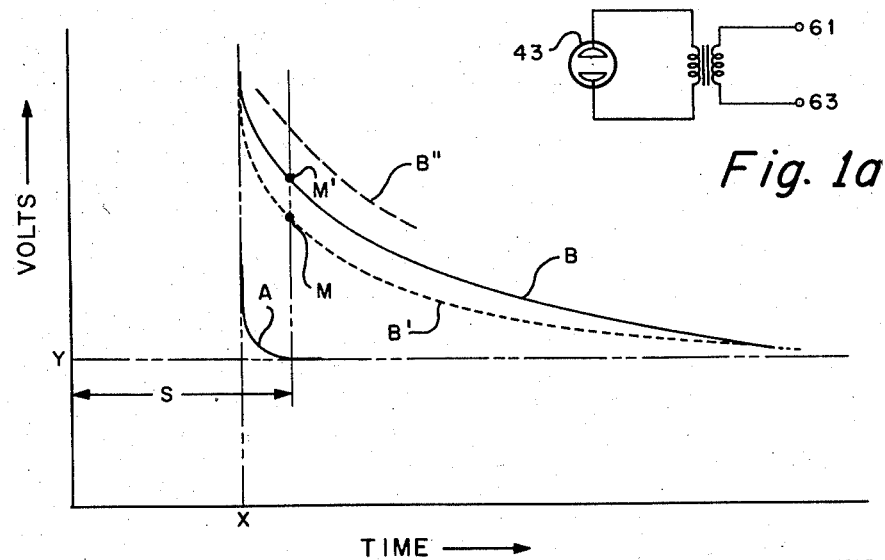
*Fig. 2*
INVENTOR.
OSCAR MARKOWITZ

2,898,547

MEANS FOR DYNAMIC TEST OF OVERVOLTAGE RELAYS

Oscar Markowitz, Philadelphia, Pa., assignor to the United States of America as represented by the Secretary of the Navy Application February 8, 1955, Serial No. 487,004

3 Claims. (Cl. 324—28)

(Granted under Title 35, U.S. Code (1952), sec. 266)

The invention described herein may be manufactured and used by or for the Government of the United States of America for governmental purposes without the payment of any royalties thereon or therefor.

The instant invention relates to a means for dynamic test of overvoltage relays and more particularly to a method for dynamic test of overvoltage relays by means of which more comprehensive test results are readily obtained, and relatively simple and compact means therefor suitable or more widespread use.

Overvoltage relays as distinguished from conventional relays have an inverse time characteristic so that the time of relay operation is an inverse function of the applied voltage. Between the limits of the highest applied voltage for the shortest operating time, which can be in the order of 5 milliseconds, and the minimum operating voltage corresponding to the maximum operating time, which can be in the order of 5 seconds, the ratio of operating times can be as great as 1 to 1000 as a function of the applied voltage. Field testing of such a relay is presently readily accomplished for its minimum operating voltage according to a well-known method by applying a voltage slightly above this minimum voltage and measuring the corresponding maximum operating time. However, the known method of testing such relays at higher operating voltages by applying these voltages and measuring the corresponding operating time of extremely short duration such as 5 to 50 milliseconds, for example, is extremely difficult if not impossible to apply without special equipment for this purpose. Consequently, rigorous tests of overvoltage relays by known methods is limited to the relatively few locations presently supplied with the equipment necessary to perform such tests by this method.

The present invention contemplates a simplified means composed of readily available components for effectively testing overvoltage relays by a new method involving the use of the fixed time standard and variation of the operating voltage applied to an overvoltage relay undergoing test.

An object of the present invention is the provision of an improved and more widely applicable method for the dynamic test of overvoltage relays.

Another object is to provide a compact and simplified means for the test of overvoltage relays by the novel method characterizing the instant invention.

A final object of this invention is to provide a means for the widespread dynamic testing of overvoltage relays at many locations where limited facilities presently preclude performance of such tests by known methods with the equipment presently available.

Other objects and many of the attendant advantages of this invention will be readily appreciated as the same becomes better understood by reference to the following detailed description when considered in connection with the accompanying drawings wherein:

Fig. 1 is a schematic circuit diagram of a preferred embodiment of means for testing overvoltage relays by the novel method contemplated in the present invention, shown in operative relationship to an overvoltage relay to be tested, Fig. 1a shows an alternate configuration for the indicator included in the circuit illustrated in Fig. 1, and Fig. 2 provides a graphical comparison of the results achieved by conventional tests of conventional relays as compared to the results achieved in testing overvoltage relays according to the teachings of the instant invention.

Referring now to the drawings, wherein like reference characters refer to like or corresponding parts throughout the several views, Fig. 1 shows one suitable configuration of means for adjusting overvoltage relays by the novel method of the present invention wherein a fixed time standard is established, as by the operation of relays of known time characteristics, and compared to the time for operaiton of the overvoltage relay under test in response to a given applied voltage. The illustrative embodiment shown in Fig. 1 is designed particularly for dynamic testing of overvoltage relays used in aircraft 28 volt D.C. electrical systems. Accordingly, the reference numerals 11, 12, and 13 designate three 24 volt batteries connected in series in order to obtain the high voltage necessary for testing overvoltage relays for a 28 volt system. The predetermined test voltage to be applied to an overvoltage relay during a test is obtained by manipulation of the adjustable tap 15. A fixed voltage tap 17 is taken at 20 volts to energize the respective relays identified by reference numerals 21, 22, and 23, respectively. Appropriate voltmeters V1 and V2 are provided to indicate the respective voltages taken from the power supply consisting of batteries 11, 12, and 13. The relays 21, 22, and 23, energized by closing switch 31 are arranged as shown in Fig. 1 so that energization of relay 21 simultaneously energizes the relay 22 through which relay 23 is energized to provide a predetermined time standard and energizes an overvoltage relay 51 to be tested. The indicator which may comprise an incandescent bulb 41, as shown in Fig. 1, or a transformer and neon lamp 43, as shown in Fig. 1a, is connected across connectors 61 and 63 and thus interposes between the relay 23 and the overvoltage relay 51 to be tested to provide means of indicating deviations in the time of operation of the overvlotage relay as compared to the standard time established by the operation of relays 22 and 23.

Referring next to Fig. 2, the curve A, theoretically becoming asymptotic to the respective base lines X and Y and in practice closely approximating this condition, represents the performance curve of a typical conventional relay which can be tested readily for operation as opposed to non-operation by applying a voltage slightly above the minimum operating voltage represented by the horizontal base line Y for a time interval represented by the vertical base line X. For conventional relays such test procedures easily performed with readily available equipment are sufficient since operability is the sole critical question.

Curve B represents a performance curve of a typical overvol age relay characterized by an inverse time constant, theoretically becoming asymptotic at one end to the base line Y and in practice approximating this relationship. In contrast to a conventional relay, an overvoltage relay is not susceptible to thorough testing by the relatively simple means outlined above, because determination of its operability alone does not constitute a complete test of its performance. Therefore, a more comprehensive method for testing such relays is required. In the method characterizing the present invention a time standard S for operation of a relay to be tested is established by suitable means such as that shown in Fig. 1. The operating time of the overvoltage relay to be tested in response to a predetermined applied voltage is measured in comparison to the time standard S by a very simple indicating means. On the basis of the indication obtained the applied voltage is adjusted and the test cycle is repeated until the operating time of the overvoltage relay to be tested coincides with the time standard represented in Fig. 2 by the vertically disposed line a distance S from the zero point on the time scale. The applied voltage at which this coincidence occurs establishes the point M on this vertical which is also on the actual performance curve B' of the overvoltage relay 51 being tested, and at a point intermediate the ends of the curve B'. Since the form of such curves is well-known and since its approximate ends points are indicated by the locations of the respective base lines X and Y, the location of curve B' is effectively established when intermediate point M has been determined by the test procedure outlined above.

In operation, the test circuit is employed according to the method outlined above by connecting an overvoltage relay to be tested to the test circuit in the manner indicated in Fig. 1. Next, the predetermined operating voltage to be applied to the overvoltage relay is provided by adjustment of the tap 15 to the desired voltage, as indicated on voltmeter V1, the voltmeter V2 is checked to determine that 20 volts is available through the fixed tap 17 to energize the respective relays 21, 22, and 23, the toggle switch 31 is then closed, initially energizing relay 21, operation of relay 21 simultaneously energizes the overvoltage relay 51 and relay 22, relay 22, in turn, operates relay 23, so that a predetermined fixed time after relay 21 has closed its contacts relay 23 has opened its contacts. If the overvoltage relay 51 closes its contacts before the fixed time standard established by relay 23 has been completed, then the lamp 41 or the alternate indicator 43 which may be substituted therefor is energized in the interval between the closing of the overvoltage relay contacts and the opening of the contacts of relay 23. This lamp flash, when it occurs, is the indication that the overvoltage relay, at the predetermined applied voltage tested, has operated in a time interval less than the fixed time standard. The test is repeated at incrementally small applied voltages provided by adjusting tap 15 until the applied voltage is reached at which the overvoltage relay will close its contacts after the relay 23 has opened its contacts and, hence, the light will not flash. With the changes in applied operating voltage held to small quantities, the voltage at which the lamp 41 first does not flash is then a sufficiently closed approximation of the voltage at which the overvoltage relay being tested operates in the fixed time standard. This applied voltage and the vertical line on Fig. 2 at the distance S from the zero point on the time scale together establish the point M which must fall on the actual performance curve B' of the overvoltage relay being tested, at a point intermediate the ends of curve B'. Since the various performance curves such as B, B', and B'' for a given relay share substantially the same end points, the curve B' passing through the determined intermediate point M may be located knowing the location of the base lines X and Y, the desired performance curve represented in Fig. 2 by curve B, and the location of the point M on curve B'. Having located curve B' relative to the desired curve B, the overvoltage relay being tested may readily be adjusted accordingly so that it once more operates in a time interval coincident with the time standard S at the applied voltage of the point M' which lies on and intermediate the ends of the proper performance curve B. The test sequence may also indicate an actual performance curve above curve B as at B''. If so, such an overvoltage relay is likewise adjusted accordingly so that it operates in the fixed standard time at the applied voltage represented by the point M' on the curve B.

The fixed time standard obtained by the circuitry illustrated in Fig. 1 may be modified as desired by suitable modification of the relays 22 and 23 which operate to establish the time standard. Alternatively, the relays may be replaced with other readily available components suitable for establishing the fixed time standard. In addition, the batteries used as the power source in the illustrative embodiment of Fig. 1, normally adjustable in increments of two volts, may be replaced with a continuously variable power source for greater accuracy in determining the applied operating voltage at which the overvoltage relay being tested operates in a time interval coincident with the fixed time standard. In the latter modification, use of the alternate indicator shown in Fig. 1a is desirable since it will flash in a time interval too short to permit the flow of current to heat the lamp 41 to incandescence, and hence provide more accurate results.

Thus, this invention provides a new method for dynamically testing overvoltage relays which may be performed by the relatively simpler equipment represented by the illustrative embodiment also disclosed herein.

Obviously, many modifications and variations of the present invention are possible in the light of the above teachings. It is, therefore, to be understood that within the scope of the appended claims the invention may be practiced otherwise than as specifically described.

What is claimed is:

1. Overvoltage relay test apparatus comprising a D.C. power supply, a first manually adjustable means for obtaining a predetermined operating voltage from said power supply, a second fixed means for obtaining a constant voltage from said power supply, a timing means including a circuit which opens a fixed time interval after it is energized to establish a fixed time standard, means for simultaneously applying said predetermined operating voltage to an overvoltage relay to be tested and said constant voltage to said timing means, indicating means interposed between an overvoltage relay being tested and the circuit included in said timing means operable when said overvoltage relay closes before the circuit is opened to indicate this sequence and thereby compare the operating time of an overvoltage relay being tested with the fixed time standard, whereby the exact voltage required to operate a given overvoltage relay in a given time may be determined by alternately regulating said first manually adjustable means and comparing the operating time of the given overvoltage relay with the fixed time standard.

2. Overvoltage relay test apparatus comprising a plurality of batteries connected in series, first and second tap means connected to said batteries, a first voltmeter connected to said first tap means at one end and to the most positive point of the series of batteries at its other end, a second voltmeter and a toggle switch in series connected at one end to said positive point of the series of batteries, a first relay having an inductor disposed across said toggle switch and said second voltmeter, means for connecting an overvoltage relay capable of discrimination between transients and maintained overvoltage to the apparatus for testing, said first relay having a first normally open contact and a second normally open contact, the first contact being electrically tied to one end of the first relay, the second contact being electrically tied to the other end of the first relay, a second relay having inductor ends disposed between the ends of the first relay contacts opposite the ends electrically tied to the first relay, said overvoltage relay having an inductor and at least one contact, the overvoltage relay inductor having one end connected to the first voltmeter and having its other end electrically tied to the end of the first relay second contact opposite the end tied to the first relay, a third relay having an inductor and a normally closed contact, the third relay inductor being connected at one end to the contact of the second relay and at its other end being electrically tied to the second relay inductor, the overvoltage relay inductor being connected at one end to one end of its contact and at its other end being electrically connected to the junction of the second relay and the second relay contact, a lamp in series with the contact of the third relay and the end of the overvoltage relay contact opposite the overvoltage relay connected end, whereby field testing of overvoltage relays at high voltages for short periods of time is readily possible, a fixed time being set by the operation of the relays and compared with the time of operation of the overvoltage relay to give visual indication of overvoltage relay time of operation compared to a fixed time, closing of the switch energizing the first and second relay to in turn energize the third relay to open the third relay contacts a given fixed time after energizing the first relay, closing of the overvoltage relay contacts before that fixed time causing the lamp to be energized for the period between closing of the overvoltage relay contacts and opening of the third relay contacts indicating overvoltage relay operation in less than the fixed time, thereby permitting testing at increments of lower voltage to determine the overvoltage at which the overvoltage relay will operate in a time interval coincident with the fixed time.

3. Overvoltage relay test apparatus comprising a plurality of batteries connected in series, first and second tap means connected to said batteries, a first voltmeter connected to said first tap means at one end and to the most positive point of the series of batteries at its other end, a second voltmeter and a toggle switch in series connected at one end to said positive point of the series of batteries, a first relay having an inductor disposed across said toggle switch and said second voltmeter, means for connecting an overvoltage relay capable of discrimination between transients and maintained overvoltage to the apparatus for testing, said first relay having a first normally open contact and a second normally open contact, the first contact being electrically tied to one end of the first relay, the second contact being electrically tied to the other end of the first relay, a second relay having inductor ends disposed between the ends of the first relay contacts opposite the ends electrically tied to the first relay, said overvoltage relay having an inductor and at least one contact, the overvoltage relay inductor having one end connected to the first voltmeter and having its other end electrically tied to the end of the first relay second contact opposite the end tied to the first relay, a third relay having an inductor and a normally closed contact, the third relay inductor being connected at one end to the contact of the second relay and at its other end being electrically tied to the second relay inductor, the overvoltage relay inductor being connected at one end to one end of its contact and at its other end being electrically connected to the junction of the second relay and the second relay contact, a transformer having a first winding disposed in series with the contact of the third relay and the end of the overvoltage relay contact opposite the overvoltage relay connected end, a second winding disposed in inductive coupling relationship to said first winding, and a neon light across said second winding whereby field testing of overvoltage relays at high voltages for short periods of time is readily possible, a fixed time being set by the operation of the relays and compared with the time of operation of the overvoltage relay to give visual indication of overvoltage relay time of operation compared to a fixed time, closing of the switch energizing the first and second relays to in turn energize the third relay to open the third relay contacts a given fixed time after energizing the first relay, closing of the overvoltage relay contacts before that fixed time causing the neon light to be energized for the period between closing of the overvoltage relay contacts and opening of the third relay contacts indicating overvoltage relay operation in less than the fixed time, thereby permitting testing at increments of lower voltage to determine the overvoltage at which the overvoltage relay will operate in a time interval coincident with the fixed time.

References Cited in the file of this patent
UNITED STATES PATENTS 2,369,619    Stibitz _____ Feb. 13, 1945
2,648,817    Schiedel _____ Aug. 11, 1953